United States Patent [19]
Hirano et al.

[11] Patent Number: 6,153,950
[45] Date of Patent: Nov. 28, 2000

[54] POWER SUPPLY DEVICE FOR ELECTRONIC EQUIPMENT

[75] Inventors: Hirotaka Hirano, Gifu; Yoshinari Higuchi, Kanagawa, both of Japan

[73] Assignee: Sony Corporation, Tokyo, Japan

[21] Appl. No.: 09/348,129

[22] Filed: Jul. 2, 1999

[30]     Foreign Application Priority Data

Jul. 6, 1998 [JP]   Japan ................................. 10-190512

[51] Int. Cl.[7] ..................................................... H02J 7/00
[52] U.S. Cl. ................................ 307/150; 307/64; 307/66
[58] Field of Search ............................ 340/447, 870.17; 320/128; 307/130, 150, 64, 66

[56]              References Cited

U.S. PATENT DOCUMENTS

| | | | |
|---|---|---|---|
| 4,839,645 | 6/1989 | Lill | 340/870.17 |
| 5,430,363 | 7/1995 | Kim | 320/120 |
| 5,825,286 | 10/1998 | Coulthard | 340/447 |

*Primary Examiner*—Stephen W. Jackson
*Assistant Examiner*—Sharon Polk

*Attorney, Agent, or Firm*—Frommer Lawrence & Haug, LLP.; William S. Frommer; Dennis M. Smid

[57]                ABSTRACT

A power supply device for an electronic equipment is able to execute an accurate discrimination even when a battery, whose characteristics are different, is attached to the electronic equipment. A power supply voltage from a battery cell 11 provided in an external battery 1 is outputted to a power supply terminal 12 and also supplied to an input terminal of an A/D converting means housed in a microcomputer 13. The microcomputer 13 stores threshold values of operation discrimination voltages of a battery (B), and these values are transmitted through a communication terminal 14. A terminal voltage, which is inputted to a power supply terminal 21 provided in an electronic equipment body 2, is applied to an internal circuit 22 or the like, and is also applied to an input terminal of an A/D converting means housed in a microcomputer 23. Also, the microcomputer 23 stores threshold values of operation discrimination voltages of an equipment body (S). Further, the microcomputer 23 includes a communication terminal 24, and the communication terminal 24 and the communication terminal 14 are connected to each other to enable the microcomputers 13, 23 to communicate with each other.

9 Claims, 2 Drawing Sheets

POWER SUPPLY DEVICE FOR ELECTRONIC EQUIPMENT

BACKGROUND OF THE INVENTION

1. Field of the Invention

The present invention relates to a power supply device for an electronic equipment suitable for use with a video camera recorder, for example. More particularly, this invention relates to a power supply device for electronic equipment in which an operation alarm voltage and an operation end voltage can be accurately identified even when characteristics of an external battery connected to electronic equipment through a connecting means are changed.

2. Description of the Related Art

Video camera recorders, for example, use a rechargeable external battery pack as a power supply thereof. In that case, the main body side of electronic equipment detects from the battery power supply the situation in which the external battery pack is consumed and displays on an arbitrary display means an alert message for letting users know when the battery pack will be fully consumed soon and an operation end message in which the battery pack is fully consumed and the electronic equipment is made unable to operate.

Specifically, in such apparatus, for example, the electronic equipment body side measures a terminal voltage of a power supply terminal of a battery connecting means. In these electronic equipments, there are previously set threshold values for operation alert message to let users know when the electronic equipment body will not be operated normally soon and threshold values for operation end message for letting users know that the electronic equipment is no longer operated normally. Then, the operation alert message and the operation end message are displayed by comparing the above-mentioned measured voltage values and these threshold values.

Recently, a variety of dry cells are commercially available on the market as an external battery. Depending on the kinds of the dry cells, it is frequently observed that some dry cells demonstrate battery characteristics different from those previously expected. That is, although it is customary that the above-mentioned threshold value for the operation alert message is set with a voltage difference in such a manner as to have a predetermined operation time prior to a threshold value of an operation end, if a voltage changing ratio during such period of time is changed, then relationships between a voltage difference and a time will not agree with each other.

In other words, in a dry cell having a characteristic in which a voltage, for example, is lowered progressively and a dry cell having a characteristic in which a voltage that has been kept to a certain degree is lowered rapidly, not only the settings of the operation alert message threshold value but also the settings of the operation end message threshold value become different from each other. However, a conventional electronic equipment in which a terminal voltage is measured by only the main body side is unable to cope with the change of the characteristics of the dry cell.

Therefore, according to the conventional apparatus, when a battery with a dry cell having different characteristics is connected to an electronic equipment, there is then the risk that the operation alert before the battery consumption and the operation end display for displaying the disabled state caused by the battery consumption will not be made correctly.

SUMMARY OF THE INVENTION

In view of the aforesaid aspect, it is an object of the present invention to provide a power supply device for an electronic equipment in which a battery includes an information processing means for A/D-converting a battery voltage and which stores threshold values of operation discrimination voltages and in which these values are transmitted to an electronic equipment body information processing means and thereby these values are compared with each other. Thus, even when a battery with a dry cell having different characteristics is connected to the electronic equipment, the comparison matched with characteristics of the dry cell of the battery can be executed, and the accurate discrimination can be easily executed by a simple means.

According to an aspect of the present invention, there is provided a power supply device for an electronic equipment to which a battery pack is connected, the battery pack including a dry cell, an analog-to-digital converter for converting a battery voltage of the dry cell into battery pack-side battery voltage information and information processing means including a memory unit for storing values of operation discrimination voltages. This power supply device for the electronic equipment is comprised of an attachment means for attaching the battery pack, a communication means for communicating information processing means housed in the attached battery pack and receiving the battery pack-side battery voltage information converted by the analog-to-digital converting means housed in the battery pack and the values of the operation discrimination voltages stored in the battery pack, an electronic equipment-side analog-to-digital converting means for converting a value of a power supply voltage supplied from a dry cell housed in the battery pack into electronic equipment-side battery voltage information, and an electronic equipment-side information processing means connected to the communication means and the analog-to-digital converting means housed in the electronic equipment, comparing batterypack-side battery voltage information from the communication means and a value of a battery pack-side operation discrimination voltage and comparing information of the electronic equipment-side battery voltage and an operation discrimination voltage stored in the electronic equipment, wherein the electronic equipment-side information processing means determines based on the compared results when one of two battery voltages becomes lower than a value of a corresponding operation discrimination voltage.

According to other aspect of the present invention, there is provided a transmission method of battery voltage information used in a microcomputer housed in a battery pack attached to an electronic equipment. This transmission method is comprised of the steps of detecting a voltage of a battery cell housed in a battery pack, storing information of an operation discrimination voltage which is a voltage higher by a predetermined amount than a voltage at which the microcomputer starts an abnormal operation and information of a voltage of the detected battery cell, and transmitting information of the stored operation discrimination voltage and information of a battery cell voltage, wherein the transmission method further includes a step which is initiated by a timer such that the transmission method is executed at a predetermined time interval.

In accordance with a further aspect of the present invention, there is provided a battery pack housed in an electronic equipment which is comprised of a battery cell, an analog-to-digital converter for detecting a voltage of the battery cell and converting the detected voltage into a digital signal, a communication means for communicating with the outside, a memory means for storing information of an operation discrimination voltage which is a voltage higher by a predetermined amount than a voltage at which a microcomputer starts an abnormal operation, and a microcomputer connected to the analog-to-digital converter, the communication means and the memory means, storing a digital signal which detected a battery cell voltage and transmitting information of the stored operation discrimination voltage and the digital signal, wherein the microcomputer is operated by a further provided timer at a predetermined time interval.

DESCRIPTION OF THE PREFERRED EMBODIMENT

The present invention will hereinafter be described with reference to the drawings.

Figure 1:
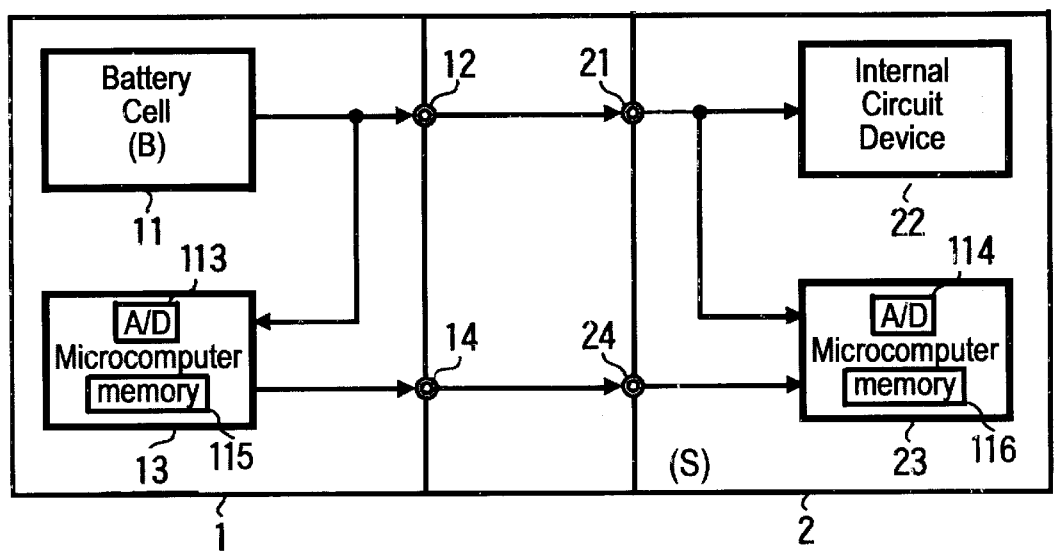
FIG. 1 is a block diagram showing a power supply device for an electronic equipment according to an embodiment of the present invention.

FIG. 1 is a block diagram showing a power supply device for the electronic equipment according to an embodiment of the present invention.

Referring to FIG. 1, an external battery pack 1 includes a battery or dry cell 11, e.g. secondary battery cell. A power supply voltage from this battery cell 11 is outputted to a power supply terminal 12. Further, the power supply voltage from this battery cell 11 is supplied to an input terminal of a microcomputer 13 incorporating an A/D (analog-to-digital) converting means 113 and which serves as an information processing means.

Then, this microcomputer 13 includes a register or memory 115 for storing the above-mentioned A/D-converted value and in which there are stored previously-set threshold values of operation discrimination voltages (operation alert voltage and operation end voltage) of a battery B. Further, this microcomputer 13 is connected to the outside via a communication terminal 14.

An electronic equipment body 2 such as a video camera recorder or the like includes a power supply terminal 21 corresponding to the above-mentioned power supply terminal 12. Then, when the battery pack is attached, a terminal voltage inputted to the power supply terminal 21 is applied to an internal circuit 22 or the like. Further, this electronic equipment body 2 includes a microcomputer 23 serving as an information processing means for controlling the equipment. The terminal voltage, which is inputted to the power supply terminal 21, is applied to an input terminal of the microcomputer 23 which incorporates an A/D converting means 114.

The value, which was converted by the above-mentioned A/D converting means, is stored in this microcomputer 23. Further, the microcomputer 23 includes a register or memory 116 in which there are stored previously-set threshold values of operation discrimination voltages (operation alert voltage and operation end voltage) of an equipment body (S). This microcomputer 23 is connected to the outside via a communication terminal 24.

The power supply voltage, which is outputted from the above-mentioned battery cell 11 to the power supply terminal 12, is applied through the power supply terminal 21 to the internal circuit 22 and so on. Further, the microcomputer 13 and the microcomputer 23 are connected to each other through the communication terminals 14, 24 and thereby a communication is made therebetween.

Figure 2A:
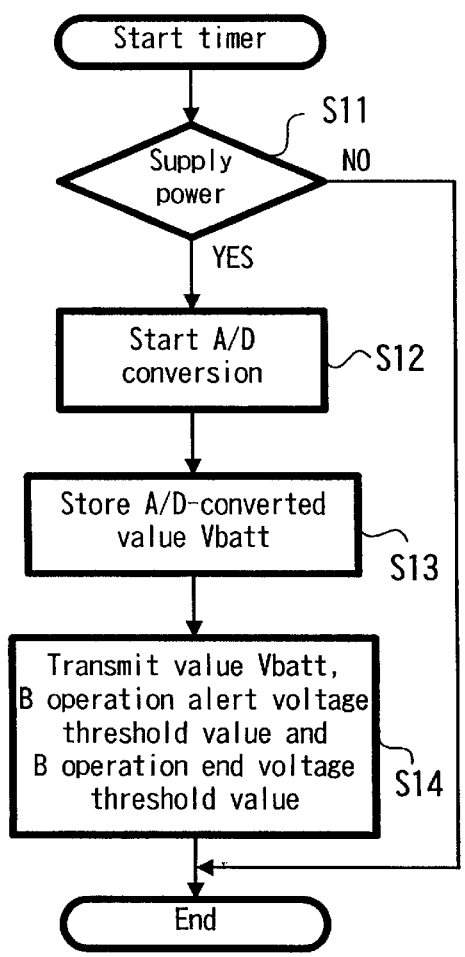
FIGS. 2A and 2B are respectively flowcharts to which reference will be made in explaining an operation of the power supply device for the electronic equipment according to the present invention.
Figure 2B:
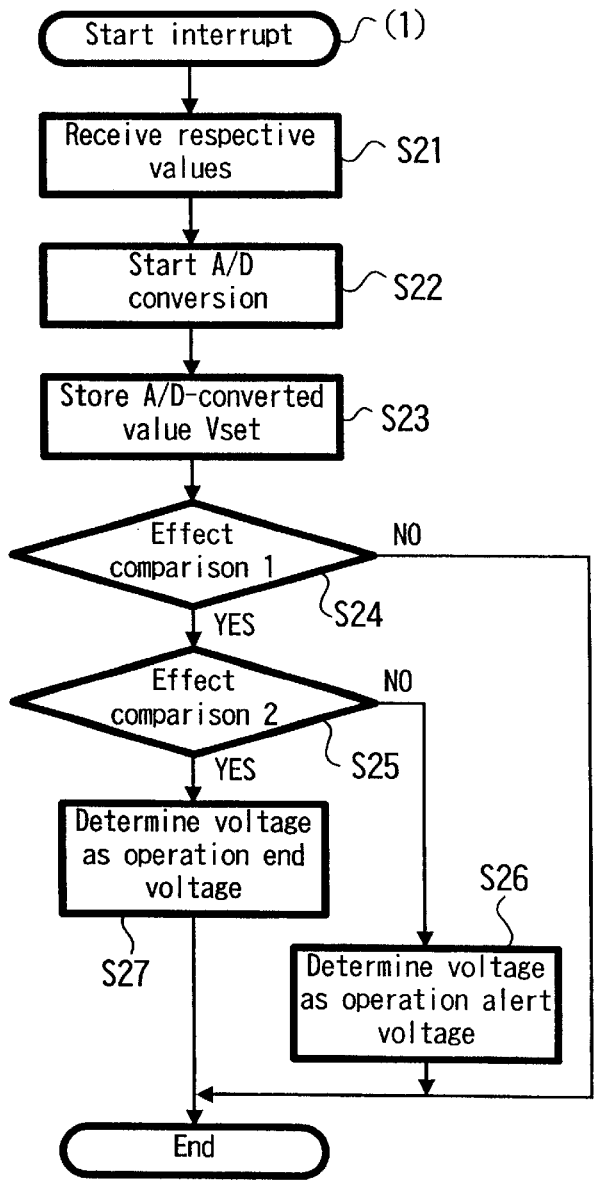

Further, in this device, the microcomputer 13 and the microcomputer 23 include discrimination processings shown in FIGS. 2A, 2B. That is, FIG. 2A shows a flowchart of processing executed by the microcomputer 13 provided in the external battery 1. FIG. 2B shows a flowchart of processing executed by the microcomputer 23 provided in the electronic equipment body 2.

Referring to FIG. 2A, this processing is repeatedly initiated by a timer means (not shown), for example, at a predetermined time interval. Referring to FIG. 2A, and following the start of the timer means, control goes to a decision step S11, in which it is determined whether or not a power is applied to the electronic equipment body 2. If the power is not applied to the electronic equipment body 2 as represented by a NO at the decision step S11, then processing is ended as it is. Therefore, the timer means need not start the microcomputer constantly, and a power consumption of the external battery 1 can be reduced. Thus, when the electronic equipment is held by the battery alone, a rechargeable battery can be held for a long period of time. Also, during a constant period of time elapsed after an operation voltage is brought about by discharge, an operation of the micro computer can be held normal. Incidentally, there are set threshold values of operation end voltages having sufficiently large voltage differences relative to the lower value of the normal operation voltage of the incorporated microcomputer.

If the power is applied to the electronic equipment as represented by a YES at the decision step S11, control goes to a step S12, whereat the A/D conversion is excited and the power supply voltage of the battery cell 11 is detected. In the next step S13, a converted value Vbatt is stored in the register. Then, in the next step S14, the value Vbatt stored in the register, the previous-set threshold value of the operation alert voltage and the threshold value of the operation end voltage of the battery (B) are transmitted to the communication terminal 14 and processing is ended.

On the other hand, in processing shown in FIG. 2B, when it is recognized that the value, which was transmitted from the microcomputer 13 to the communication terminal 14 at the above-mentioned step S14, for example, is supplied from the communication terminal 24 to the microcomputer 23, processing is started by an interrupt.

Referring to FIG. 2B, and following the start of the interrupt process, in a step S21, respective values supplied to the communication terminal 24 from the microcomputer 13 are received by the microcomputer 23, and the respective received values are stored in an arbitrary register. Further, in a step S22, the A/D conversion is started, and the terminal voltage of the power supply terminal 21 is detected. In the next step S23, a converted value Vset is stored in an arbitrary register.

Further, there is executed a comparison 1 of the values stored in the arbitrary registers at the step S24. That is, in this comparison 1, the following values are compared with each other:

value Vbatt<threshold value of operation alert voltage of battery (B)

value Vset<threshold value of operation alert voltage of equipment body (S)

If answers of both of them are negative (NO), then processing is ended as it is.

If one of them is affirmative (YES) at the decision step S24, then control goes to the next decision step S25, in which there is executed a comparison 2 of the values stored in the arbitrary registers. That is, in this comparison 2, the following values are compared with each other:

value Vbatt<threshold value of operation end voltage of battery (B)

value Vset<threshold value of operation end voltage of equipment body (S)

If answers of both of them are negative (NO) at the decision step S25, then control goes to a step S26, whereat it is determined that they are the operation alert voltages, and processing is ended. If one of them is affirmative (YES) at the decision step S25, then control goes to a step S27, whereat it is determined that they are the operation end voltages, and processing is ended.

Thus, when the power supply voltage from the battery cell 11, for example, is progressively lowered and reached to the threshold value of the operation alert voltage of the battery (B), it is determined that the above-mentioned power supply voltage is the operation alert voltage. Hence, an operation alert message is displayed on an arbitrary display means (not shown) or the like. When the power supply voltage of the battery cell 11 is further lowered and reached to the threshold value of the operation end voltage of the battery (B), it is determined that the above-mentioned power supply voltage is the operation end voltage. Hence, the operation end message is displayed on an arbitrary display means (not shown) or the like.

Also, when the terminal voltage at the power supply terminal 21 is lowered and reached to the threshold value of the operation alert voltage of the equipment body (S), it is determined that the above-mentioned terminal voltage is the operation alert voltage. Hence, the operation alert message is displayed on an arbitrary display means (not shown) or the like. Further, when the terminal voltage at the power supply terminal 21 is lowered and reached to the threshold value of the operation end voltage of the equipment body (S), it is determined that the above-mentioned terminal voltage is the operation end voltage. Hence, the operation end message is displayed on an arbitrary display means (not shown) or the like.

Then, in this case, since it is determined that not only the terminal voltage at the power supply terminal 21 is lowered but also the power supply voltage from the battery cell 11 is discriminated and also this discrimination is executed by the previously-set threshold values of the operation discrimination voltages (operation alert voltage and operation end voltage) of the battery (B) in 1 side, it is possible to execute the comparison matched with the characteristics of the dry cell provided in the battery, for example. Thus, the accurate discrimination can be easily carried out by a simple means.

Accordingly, in this device, since the battery includes the information processing means for A/D-converting the battery voltage and which stores the threshold values of its operation discrimination voltages and these values are compared with each other by transmitting these values to the information processing means of the electronic equipment body, even when the battery including the dry cell having different characteristics is connected to the electronic equipment, the comparison matched with the characteristics of the dry cell provided in that battery can be carried out. Thus, the accurate discrimination can be easily carried out by the simple means.

Therefore, unlike the conventional device in which there is then the risk that the operation alert before the battery consumption and the operation end display for displaying the disabled state caused by the battery consumption will not be made when the battery including the dry cell having different characteristics is connected to the electronic equipment, the present invention can easily solve these problems.

As described above, according to the power supply device for the electronic equipment, in the power supply device for the electronic equipment to which the external battery is connected through the connecting means, since the battery includes the first information processing means for A/D-converting the battery voltage and which stores the threshold values of the operation discrimination voltages, the electronic equipment body includes the second information processing means for A/D-converting the terminal voltage of the connecting means and which stores the threshold values of the operation discrimination voltages, the connecting means includes the communication terminal for communicating the information of the first information processing means, the first information processing means transmits the A/D-converted value of the battery voltage and the threshold value of its operation discrimination voltage, the second information processing means compares the A/D-converted value of the battery voltage transmitted from the first information processing means and the threshold value of its operation discrimination voltage, the second information processing means compares the A/D-converted value of the terminal voltage and the threshold value of its operation discrimination voltage and it is determined by the second information processing means that the battery voltage or the terminal voltage becomes lower than the threshold value of its operation discrimination voltage, the comparison matched with the characteristics of the dry cell provided in the battery can be carried out, and hence the accurate discrimination can be easily carried out by the simple means.

The present invention is not limited to the above-mentioned embodiment and can be variously modified without departing from the spirit of the invention.

Therefore, according to the present invention, since the battery includes the information processing means for A/D-converting the battery voltage and which stores the threshold values of its operation discrimination voltages and these values are compared with each other by transmitting these values to the information processing means of the electronic equipment body, even when the battery including the dry cell having different characteristics is connected to the electronic equipment, the comparison matched with the characteristics of the dry cell provided in that battery can be carried out. Thus, the accurate discrimination can be easily carried out by the simple means.

Therefore, unlike the conventional device in which there is then the risk that the operation alert before the battery consumption and the operation end display for displaying the disabled state caused by the battery consumption will not be made when the battery including the dry cell having different characteristics is connected to the electronic equipment, the present invention can easily solve these problems.

Having described a preferred embodiment of the invention with reference to the accompanying drawings, it is to be understood that the invention is not limited to that precise embodiment and various changes and modifications could be effected therein by one skilled in the art without departing from the spirit or scope of the invention as defined in the appended claims.

What is claimed is:

1. In a power supply device for an electronic equipment to which a battery pack is connected, said battery pack including a dry cell, an analog-to-digital converter for converting a battery voltage of said dry cell into battery pack-side battery voltage information and information processing means including a memory unit for storing values of operation discrimination voltages, said power supply device for electronic equipment comprising:

a communication means for communicating information processing means housed in said attached battery pack and receiving said battery pack-side battery voltage information converted by said analog-to-digital converting means housed in said battery pack and the values of said operation discrimination voltages stored in said battery pack;

an electronic equipment-side analog-to-digital converting means for converting a value of a power supply voltage applied from a dry cell housed in said battery pack into electronic equipment-side battery voltage information; and an electronic equipment-side information processing means connected to said communication means and said analog-to-digital converting means housed in said electronic equipment, comparing battery pack-side battery voltage information from said communication means and a value of a battery pack-side operation discrimination voltage and comparing information of said electronic equipment-side battery voltage and an operation discrimination voltage stored in said electronic equipment, wherein said electronic equipment-side information processing means discriminates based on said compared results when one of two battery voltages becomes lower than a value of a corresponding operation discrimination voltage.

2. A power supply device for an electronic equipment as claimed in claim 1, wherein said operation discrimination voltage is a voltage higher than a voltage at which an operation of said electronic equipment becomes unstable.

3. A power supply device for an electronic equipment as claimed in claim 1, wherein said communication means executes a comparing operation by receiving information transmitted from said battery pack at a predetermined time interval.

4. A power supply device for an electronic equipment as claimed in claim 3, wherein said electronic equipment-side analog-to-digital converting means and said electronic equipment-side information processing means are formed integrally as one body.

5. A power supply device for an electronic equipment as claimed in claim 4, wherein said electronic equipment-side information processing means is comprised of a microcomputer and operation discrimination voltage information is stored in said microcomputer.

6. In a transmission method of battery voltage information used in a microcomputer housed in a battery pack attachable to electronic equipment, said transmission method comprising the steps of:

detecting a voltage of a battery cell housed in a battery pack;

storing information of an operation discrimination voltage which is a voltage higher by a predetermined amount than a voltage at which said microcomputer starts an abnormal operation and information of the detected voltage of said battery cell;

transmitting information of said stored operation discrimination voltage and the detected voltage of said battery cell from said battery pack; and comparing in the electronic equipment the operation discrimination voltage information and the detected voltage information of said battery cell transmitted from said battery pack, wherein said transmission method further includes a step which is started by a timer such that said transmission method is executed at a predetermined time interval.

7. A battery pack operable with an electronic device, comprising:

a battery cell;

an analog-to-digital converter for detecting a voltage of said battery cell and converting said detected voltage into a digital voltage signal;

a microcomputer;

communication means for communicating with the outside; and memory means for storing information of an operation discrimination voltage which is a voltage higher by a predetermined amount than a voltage at which the microcomputer starts an abnormal operation;

wherein said microcomputer is connected to said analog-to-digital converter, said communication means and said memory means, stores the digital voltage signal and transmits information of said stored operation discrimination voltage and said digital voltage signal, wherein said microcomputer is operated by a timer further provided at a predetermined time interval, and wherein the transmitted operation discrimination voltage information and the voltage signal information of said battery cell are compared in the electronic device.

8. A battery pack as claimed in claim 7, wherein said operation discrimination voltage information transmitted to the outside is an operation discrimination voltage of a video camera recorder.

9. A battery pack as claimed in claim 7, wherein said operation discrimination voltage information transmitted to the outside is an operation alert voltage or an operation end voltage.

* * * * *